(12) United States Patent
McKeown et al.

(10) Patent No.: US 6,473,730 B1
(45) Date of Patent: Oct. 29, 2002

(54) METHOD AND SYSTEM FOR TOPICAL SEGMENTATION, SEGMENT SIGNIFICANCE AND SEGMENT FUNCTION

(75) Inventors: Kathleen R. McKeown, Wayne, NJ (US); Judith L. Klavans, Hastings-on-Hudson, NY (US); Min-Yen Kan, Bethesda, MD (US)

(73) Assignee: The Trustees of Columbia University in the City of New York, New York, NY (US)

( * ) Notice: Subject to any disclaimer, the term of this patent is extended or adjusted under 35 U.S.C. 154(b) by 0 days.

(21) Appl. No.: 09/290,643

(22) Filed: Apr. 12, 1999

(51) Int. Cl.[7] ............................ G06F 17/27; G06F 17/21
(52) U.S. Cl. ............................................ 704/9; 707/531
(58) Field of Search ...................... 704/1, 9, 10; 707/3, 707/4, 5, 6, 102, 530, 531, 532

(56) References Cited

U.S. PATENT DOCUMENTS

| | | | |
|---|---|---|---|
| 5,642,520 A | | 6/1997 | Takeshita et al. .............. 704/3 |
| 5,748,805 A | * | 5/1998 | Withgott et al. ............ 382/306 |
| 5,799,268 A | * | 8/1998 | Boguraev ...................... 704/9 |
| 5,913,185 A | * | 6/1999 | Martino et al. ................ 704/8 |
| 6,038,560 A | * | 3/2000 | Wical ............................ 707/5 |
| 6,070,133 A | * | 5/2000 | Brewster et al. ............... 704/9 |
| 6,199,034 B1 | * | 3/2001 | Wical ............................ 704/9 |
| 6,212,494 B1 | * | 4/2001 | Boguraev ...................... 704/9 |

OTHER PUBLICATIONS

M. Hearst, "Multi–Paragraph Segmentation of Expository Text," *Proceedings of the 32nd Annual Meeting of the Association for Computational Linguistics* (1994).

D. Marcu, "The Rhetorical Parsing of Natural Language Texts," *The Proceedings of the 35th Annual Meeting of the Association for Computational Linguistics* at pp. 96–103 (1997).

Y. Yaari, "Segmentation of Expository Text by Hierarchical Agglomerative Clustering," *Recent Advances in NLP 1997, Bulgaria* (1997).

J. Justeson and S. Katz, "Technical Terminology: Some Linguistic Properties and an Algorithm for Identification in Text," *Natural Language Engineering*, vol. 1(1) at pp. 9–29 (1995).

C. G. Youmans, "A New Tool for Discourse Analysis: The Vocabulary–Management Profile," *Language*, vol. 67 at pp. 763–789 (1991).

R. J. Passonneau and D. J. Litman, "Intention–Based Segmentation: Human Reliability and Correlation with Linguistic Cues," *Proceeding of the 31st Annual Meeting of the Association of Computation Linguistics*, pp. 148–155 (1993).

* cited by examiner

*Primary Examiner*—Patrick N. Edouard
(74) *Attorney, Agent, or Firm*—Baker Botts LLP

(57) ABSTRACT

A "domain-general" method for topical segmentation of a document input includes the steps of: extracting one or more selected terms from a document; linking occurrences of the extracted terms based upon the proximity of similar terms; and assigning weighted scores to paragraphs of the document input corresponding to the linked occurrences. In accordance with the present invention, the values of the assigned scores depend upon the type of the selected terms, e.g., common noun, proper noun, pronominal, and the position of the linked occurrences with respect to the paragraphs, e.g., front, during, rear, etc. Upon zero-sum normalization, the assigned scores represent the boundaries of the topical segments of the document input.

35 Claims, 8 Drawing Sheets

```
paras  1       2  3      4       5          7       8
sents  123456789012345678901234567890123456789012345
wine   :       1 x x 1                      1 x 2 1
type   : n     f   d     r       n          f       d
```

FIG. 4

Term type: Common Nouns        Link length: 4 sentences

Text:
Wine ____ ____ __.  ___ ___ _____.
___ __ ____ wine . __ ___ _____ __ __.
___ ___ ____ ____ _ ____ _ __. __ ___.
____ __ ___ _____ ___. ____ ____
_____.  _____ ____ wine .  ____ wine .

2 term links    | 1 0 1 | 0 0 0 0 0 | 1 1 |

FIG. 5

Term type: Proper Nouns          Link length: 8 sentences

Text:
John ____ _____ __. ___ ___ _____.
___ __ ____ John. __ ___ _____ __ __.
___ ___ ____ ___ _ ___ _ __. __ ___.
____ ___ __ _____ ___. ____ ____
_____. _____ ____ John. ____ John.

1 term link    | 1 0 1 0 0 0 0 0 1 1 |

FIG. 6

Term type: Pronominals          Link length: 1 sentence

Text:
They ____ _____ __. ___ ___ _____.
___ __ ____ them. __ ___ _____ __ __.
___ ___ ____ ___ _ ___ _ __. __ ___.
____ ___ __ _____ ___. ____ ____
_____. _____ ____ them. ____ them.

3 term links    |1| 0 |1| 0 0 0 0 0 |1 1|

FIG. 7

```
paras   1        2   3         4         5         7      8
sents   1234567890123456789012345678901 2345
wine :          1 x x 1                              1 x 21
type :n         f   d         r         n           f      d
score :*        10  -3        8         *           10     -3 sum to balance in zero-sum weighting:               +22
zero : -11      10  -3        8        -11          10     -3
```

FIG. 8

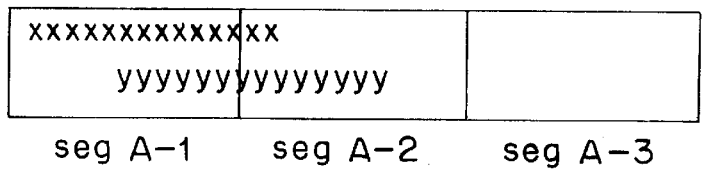

seg A-1    seg A-2    seg A-3

FIG. 11A

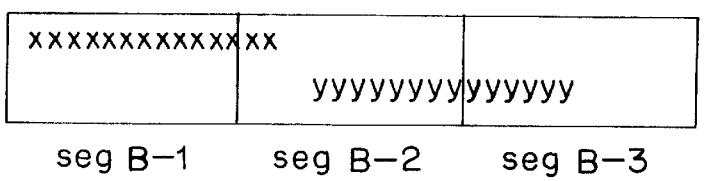

seg B-1    seg B-2    seg B-3

FIG. 11B

```
for each segment
  {
  { // importance calculation
      raw_seg_importance = sum of TF*SF per NP term;
      seg_importance = raw_seg_importance /
          (max raw_seg_importance over all segments);
  }
  { // coverage calculations
      raw_seg_coverage = sum of counters per NP term;
      seg_coverage = raw_seg_coverage /
          (max coverage over all segments);
  }
    seg_significance = seg_importance + seg_coverage;
  }
```

FIG. 12

METHOD AND SYSTEM FOR TOPICAL SEGMENTATION, SEGMENT SIGNIFICANCE AND SEGMENT FUNCTION

STATEMENT REGARDING FEDERALLY SPONSORED RESEARCH

The invention described herein was funded in part by a grant from the National Science Foundation, namely, NSF grant #IRI-9618797. The United States Government may have certain rights under the invention.

SPECIFICATION

A portion of the disclosure of this patent document contains material which is subject to copyright protection. The copyright owner has no objection to the facsimile reproduction by anyone of any portion of the patent document, as it appears in any patent granted from the present application or in the Patent and Trademark Office file or records available to the public, but otherwise reserves all copyright rights whatsoever.

An appendix containing source code listing utilized in practicing an exemplary embodiment of the invention is included as part of the Specification and is hereinafter referred to as Appendix A. Appendix A is found on pages 30–59 of the Specification.

FIELD OF THE INVENTION

The present invention relates in general to the field of natural language processing and automatic text analysis and summarization. More particularly, the present invention relates to a method and system for topical segmentation of a document and classification of segments according to segment function and importance.

BACKGROUND OF THE INVENTION

Identification of a document's discourse structure can be extremely useful in natural language processing applications such as automatic text analysis and summarization and information retrieval. For example, simple segmentation of a document into blocks of topically similar text can be useful in assisting text search engines to determine whether or not to retrieve or highlight a particular segment in which a query term occurs. Similarly, topical segments can be useful in assisting summary agents to provide detailed summaries by topic in accordance with a segment function and/or importance. Topical segmentation is especially useful for accurately processing long texts having multiple topics for a wide range of natural language applications.

Conventional methods for topical segmentation, such as in Hearst's TextTiling program, identify zero or more segment boundaries at various paragraph separations, which in turn identify one or more topical text segments. See M. Hearst, "Multi-Paragraph Segmentation of Expository Text," Proceedings of the 32nd Annual Meeting of the Association for Computational Linguistics (1994). Topical segmentation is thus linear, but based solely upon the equal consideration of selected terms. Terms are regarded as equally important in deciding how to segment the document input, and as such segmentation does not leverage the differences between term types. TextTiling, in addition, makes no effort to measure the significance and function of identified topical segments.

Other conventional methods use hierarchical segmentation to create tree-like representations of a document's discourse structure. See U.S. Pat. No. 5,642,520; D. Marcu, "The Rhetorical Parsing of Natural Language Texts," *The Proceedings of the 35th Annual Meeting of the Association for Computational Linguistics* at pp. 96–103 (1997); Y. Yaari, "Segmentation of Expository Text by Hierarchical Agglomerative Clustering," Recent Advances in NLP 1997. Bulgaria (1997). Hierarchical segmentation attempts to calculate not only topic boundaries, but also subtopic and sub-subtopic boundaries. This is inherently a more difficult task and can be prone to more sources of error. Researchers also define "topic" differently such that many times a topic boundary in one text can correspond to a subtopic or a supertopic in another segmentation program.

Still other conventional hierarchical schemes, for example, use complex "attentional" models or rules that look at the topic of discussion for a particular sentence; that is, the focus of the sentence. Attentional models are commonly used to determine pronominal resolution, e.g., what person does "he" or "she" refer to in the text, and usually require contextual knowledge that is often difficult to glean from the language input using automated methods. See U.S. Pat. No. 5,642,520.

Again, as with conventional linear segmentation schemes, no effort is made with conventional hierarchical schemes to determine the contextual significance or function of the identified topical segments.

SUMMARY OF THE INVENTION

The aforedescribed limitations and inadequacies of conventional topical segmentation methods are substantially overcome by the present invention, in which a primary object is to provide a method and system for segmenting text documents so as to efficiently and accurately identify topical segments of the documents.

It is another object of the present invention to provide system and method that identifies the significance of identified topical segments.

It is yet another object of the present invention to provide system and method that identifies the function of identified topical segments.

In accordance with a preferred method of the present invention, a method is provided that includes the steps of: extracting one or more selected terms from a document; linking occurrences of the extracted terms based upon the proximity of similar terms; and assigning weighted scores to paragraphs of the document input corresponding to the linked occurrences, wherein the scores depend upon the type of the selected terms and the position of the linked occurrences with respect to the paragraphs, and wherein the scores represent boundaries of the topical segments.

In accordance with another preferred method of the present invention, a method is provided for automatically extracting significant topical information from a document, the method including the steps of: extracting topical information from a document in accordance with specified categories of information; linking occurrences of the extracted topical information based on the proximity of similar topical information; determining topical segments within the document corresponding to the linked occurrences of the topical information; and determining the significance of the topical segments.

In another aspect of the present invention, a computer program is provided for topical segmentation of a document's input. The computer program includes executable commands for: extracting selected terms from a document; linking occurrences of the extracted terms based upon the proximity of similar terms; and assigning weighted scores to paragraphs of the document input corresponding to the linked occurrences, wherein the scores depend upon the type of the selected terms and the position of the linked occurrences with respect to the paragraphs, and wherein the scores represent boundaries for the topical segments.

In yet another aspect of the present invention, a computer program is provided for automatically extracting significant topical information from a document. The computer program includes executable commands for: extracting topical information from a document in accordance with specified categories of information; linking occurrences of the extracted topical information based on the proximity of similar topical information; determining topical segments within the document corresponding to the linked occurrences of the topical information; and determining the significance of the topical segments.

BRIEF DESCRIPTION OF THE DRAWINGS

For a complete understanding of the present invention and the advantages thereof, reference is now made to the following description taken in conjunction with the accompanying drawings in which like reference numbers indicate like features and wherein:

FIG. 4 is an example of a summary report generated by the computer program represented by the flow diagram of FIG. 3 indicating the occurrences and type of occurrences for the term "wine" present in a document input;

FIG. 5 shows an example of term linking for a common noun having a link length of n=4 sentences;

FIG. 6 shows an example of term linking for a proper noun having a link length of n=8 sentences;

FIG. 7 shows an example of term linking for a pronominal having a link length of n=1 sentence;

FIG. 8 is an example of a summary report generated by the computer program represented by the flow diagram of FIG. 3 indicating the occurrences, type of occurrences, links and segment scores associated with the term "wine" present in a document input;

FIG. 11 shows an example of segment coverage; and

FIG. 12 shows a pseudocode listing for an algorithm for computing segment importance in accordance with the preferred embodiments of FIGS. 2 and 3.

DETAILED DESCRIPTION OF THE INVENTION

Figure 1:
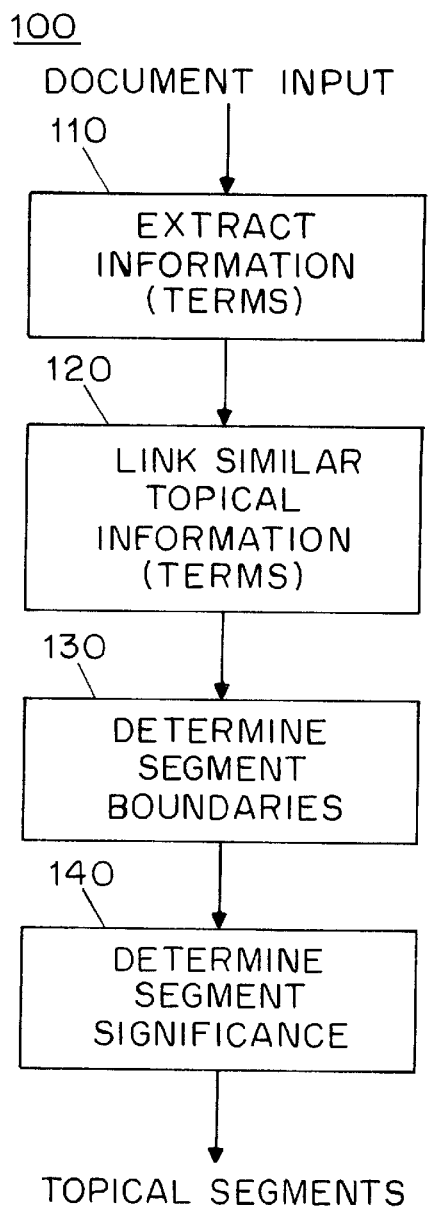
FIG. 1 is a flow diagram of a preferred method for automatically extracting significant topical information from a document.

FIG. 1 shows a flow diagram of a preferred method 100 for automatically extracting significant topical information from a document. The method includes the steps of: extracting topical information from a document in accordance with specified categories of information (Step 110); linking occurrences of the identified topical information based on the proximity of similar topical information (Step 120); determining topical segments within the document corresponding to the linked occurrences of the topical information; and determining the significance of the topical segments (Step 130). Topical information are terms that reflect the topical content of the text, preferably noun phrases (NP's) such as proper noun phrases or common noun phrases, and personal and possessive pronouns (pronominals). As described in detail below, the extracted topical information is then processed using a novel linear segmentation technique, wherein the document input is divided into adjacent segments. We achieve a 10% increase in both precision and recall over conventional topical segmentation techniques as discussed below with respect to a selected corpus of domain-independent news articles.

Figure 2:
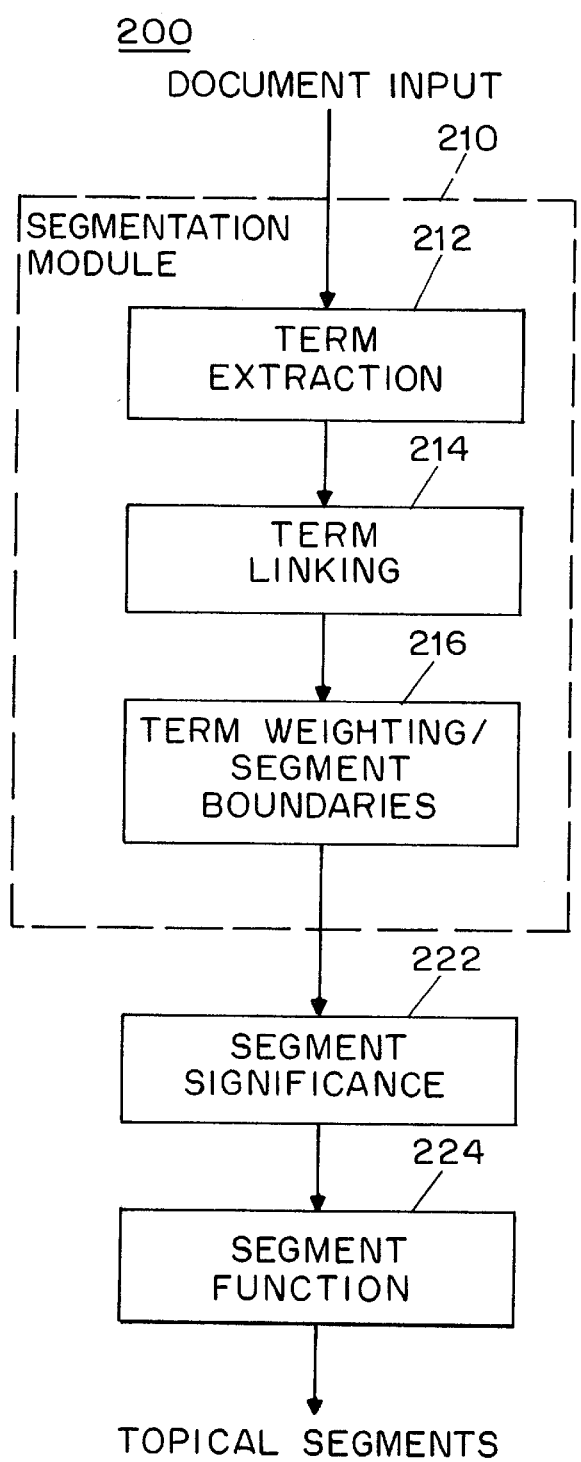
FIG. 2 is a flow diagram representing a preferred embodiment of a computer program for implementing the method of FIG. 1.
Figure 3:
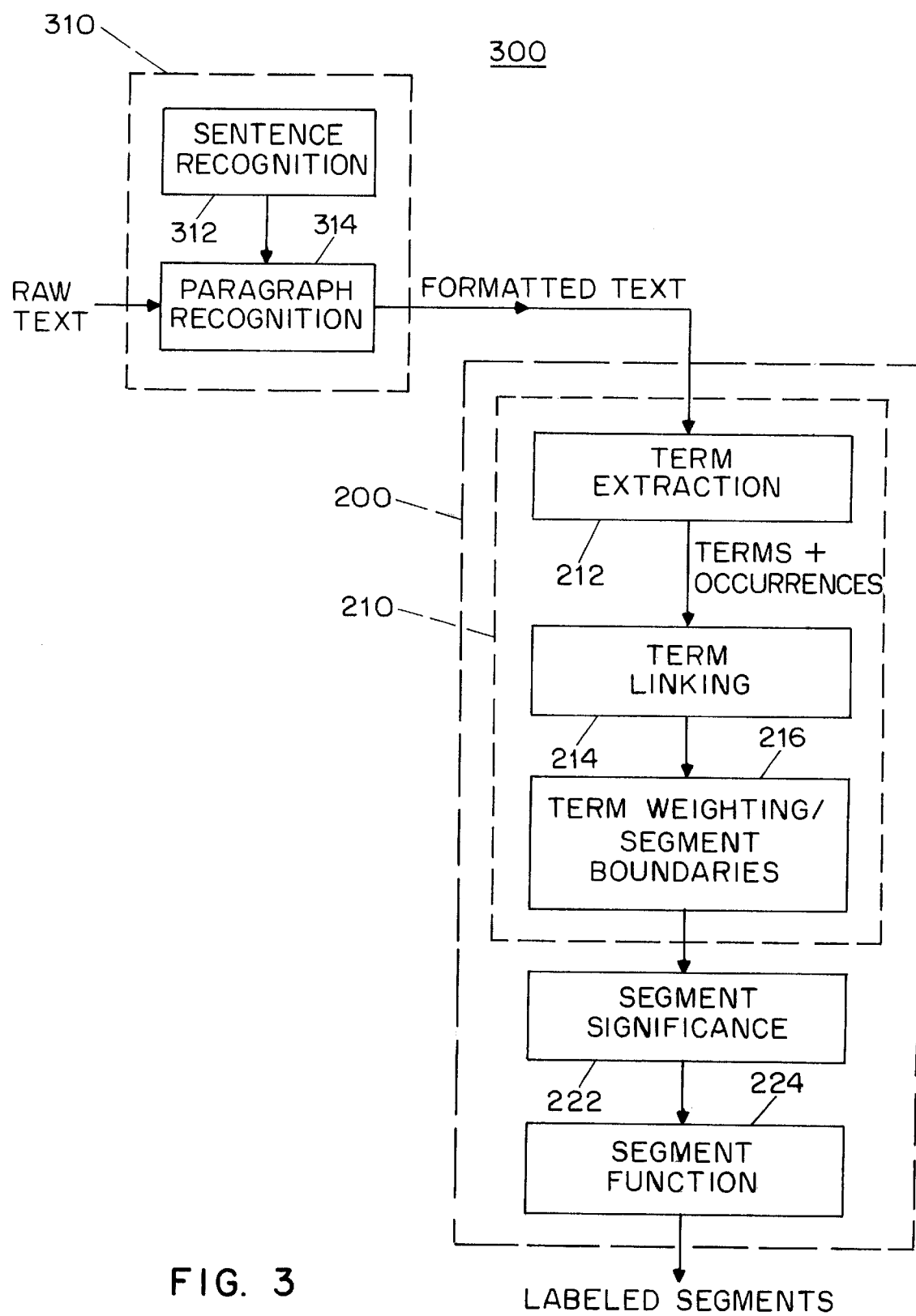
FIG. 3 is a flow diagram representing another preferred embodiment of a computer program for implementing the method of FIG. 1.

FIG. 2 shows a flow diagram of preferred embodiment of a computer program 200 that implements the method of FIG. 1. The program 200 includes a segmentation module 210, a segment significance module 222 and a segment function module 224. A flow diagram of a further preferred embodiment, as shown in FIG. 3, is provided as the Segmenter source code listing in Appendix A. The segmentation module 210 is embodied in the Termer source code listing and lines 1–300 of the Segmenter source code listing, and the significance and function modules 222 and 224 in lines 300–400 of the Segmenter source code listing.

As shown in FIGS. 2 and 3, the program 200 first includes a term extraction module 212 for extracting selected terms from a document input, preferably to include at least three types of noun phrases, e.g., proper, common and pronominal noun phrases, that reflect the topical content of the document input. As further shown in FIG. 3, the document input in the form of raw text is pre-processed by module 310, and then assigned a part of speech (POS) information by a term extraction module 212. A source code listing of a term extraction module, Termer, is provided in Appendix A. However, the POS tagger or term extraction module can be any tagger or module known to those skilled in the art. A standard POS tagger or term extraction module 212, for example, can combine a lexicon or table lookup with contextual probabilities, or just the lexicon. Preferably, in the interest of efficiency, a standard table lookup method favoring noun POS tags is used in the preferred methods and embodiments of the present invention.

In addition, the pre-processing module 310 of the flow diagram of FIG. 3 further includes sentence and paragraph recognition modules 312 and 314, which may be any suitable module or modules for providing sentence and paragraph delimitation information from a raw text document input. Source code listings of exemplary paragraph and sentence recognition modules LayoutRecognizer and SentenceRecognizer are also provided in Appendix A.

Referring again to FIGS. 2 and 3, once POS tags have been assigned, occurrences of the above-identified noun phrases (terms) are retrieved by term extraction module 212 by searching the document for nouns preceded by zero or more adjectives or nouns, i.e., the simple regular expression (Adj|Noun)*Noun. A "term" is thus defined as any word or words that satisfy this regular expression. This expression has been determined to be suitable for capturing simple noun phrases, and is not specially designed for identifying more complex noun phrases such as, for example, "proprietor of Stag's Leap Wine Cellars in Napa Valley." See J. Justeson and S. Katz, "Technical Terminology: Some Linguistic Properties and an Algorithm for Identification in Text, "*Natural Language Engineering*, vol. 1(1) at pp. 9–29 (1995). Although not well-suited for complex noun phrases, the term extraction module 212 functions to extract as many noun phrases as possible, since the emphasis is on high NP recall. Thus, noun phrases in the example "proprietor of Stag's Leap Wine Cellars in Napa Valley" would be extracted as three different phrases: "proprietor," "Stag's Leap Wine Cellars" and "Napa Valley."

After the selected terms are extracted, the term extraction module 212 performs post-processing of the extracted terms to combine related term occurrences in accordance with any number of predefined language rules to form term links or units. For example, for possessive pronouns such as "my" or "mine" are merged with their appropriate personal pronoun, i.e., "I" Noun phrases are reduced or canonicalized according to their heads where possible. For example, if the noun phrases "red wine" and "wine" are found in the document input, occurrences of the terms "red wine" are subsumed into the occurrences of the term "wine," under the strict condition that no other noun phrases, such as "white wine," are identified having the head "wine."

After post-processing, the term extraction module 212 performs a final thresholding step in order to filter irrelevant words. See J. Justeson and S. Katz, "Technical Terminology: Some Linguistic Properties and an Algorithm for Identification in Text," *Natural Language Engineering,* vol. 1(1) at pp. 9–29 (1995). By thresholding, the term extraction module 212 uses a predefined frequency threshold of a minimum of two occurrences to determine topicality. The frequency threshold however can be varied if desired. Any pronouns or noun phrases with fewer occurrences than the frequency threshold are discarded.

Once extracted, the term linking module 214 is implemented to evaluate the extracted terms so as to arrive at a topical segmentation of the document input. Given a single term and the distribution of its occurrences, related occurrences of the term are linked together using proximity as the metric for relatedness. If two occurrences of a term occur within a linking distance of n sentences, the two occurrences are linked together as a single unit. This process is repeated until no further larger units can be built.

As indicated above, the link length or linking distance n refers to the number of sentences allowed to intervene between two occurrences of a single term. The linking distances n for the three categories of selected noun phrases, i.e., common noun phrases, proper noun phrases and pronominals, are selectable and have been found to depend upon the type of term in question, with proper nouns having the maximum allowable distance and the pronominal forms having the shortest linking distances. Proper nouns generally refer to the same entity, almost regardless of the number of intervening sentences. Common nouns often have a much shorter scope of reference, since a single token can be used to repeatedly refer to different instances of its class. Personal pronouns scope even more closely, since the referent to a personal pronoun could change over the course of a document. In addition, any unlinked terms are dropped from further consideration.

FIG. 4 illustrates the linking of term occurrences for the word "wine" having a linking distance n=4. The figure is a partial output of the program of FIG. 3 showing information related to a sample document input having a total of 8 paragraphs and 35 sentences. The first line labeled "paras" indicates the paragraph numbers of the document input, and the second line labeled "sents" indicates the sentence numbers numbered sequentially in a repeating sequence of 1 to 0(10). The third line labeled "wine" shows the frequency of occurrence for the word "wine" by paragraph and sentence, with "x" denoting a zero occurrence within a specified link. Therefore, FIG. 4 shows that the word "wine" appears once in paragraph 2 (sentence 7), once in paragraph 3 (sentence 10), once in paragraph 7 (sentence 2), and three times in paragraph 8 (twice in sentence 4, once in sentence 5). Accordingly, with a linking distance equal to four sentences, the term linking module 214 thus yields two links for the word "wine" in the sample document input.

FIGS. 5–7 show further examples of term linking in accordance with the present invention. FIG. 5 shows a preferred linking distance n=4 for common nouns, e.g., "wine"; FIG. 6 shows a preferred linking distance n=8 for proper nouns, e.g., "John"; and FIG. 7 shows a preferred linking distance n=1 for pronominals, e.g., "they" or "them." In FIG. 5, for example, individual occurrences of the word "wine" in sentences 1 and 3 are linked together as a single unit because they are less than n=4 sentences apart. Likewise, the occurrences at lines 9 and 10 are linked together to form a second unit.

Referring again to FIGS. 2 and 3, after the appropriate number of term links are established, the term weighting/segment boundaries module 216 is implemented to assign a weight to each of the term links. Since paragraph level boundaries are not considered in the term linking step, each of the individual term links are first normalized to the paragraph level. Thus, each of the paragraphs is provided with a label indicating its positional relationship with respect to the individual term link(s) contained therein.

In accordance with the present invention, four categories of paragraph labels are provided: front (f), rear (r), during (d) and no link (n). A "front" paragraph is defined as a paragraph in which a specified link begins, wherein a "rear" paragraph is defined as a paragraph in which a link just stopped occurring the paragraph before. "During" indicates a paragraph in which a link occurs, but one that is not a "front" paragraph. "No link" indicates any remaining unlabeled paragraphs.

Referring again to FIG. 4, the common noun "wine" appears a total of six times as shown by the numbers in the third row of the figure. These occurrences have been grouped together to form two term links, as joined by the "x" marks between the occurrences. The bottom line labeled "type" shows the labeling of each paragraph shown in the first line according the above-described categories. As shown in FIG. 4, t is possible for a term ("wine") to have multiple front and rear paragraphs, since a term may have more than a single link.

Next, as described with reference to FIGS. 2 and 3, for each of the four categories of paragraph labeling, and for each of the three noun phrase types, the term weighting/segment boundaries module 216 assigns a predefined segmentation weight to each of the paragraphs. Table 1 shows sample segmentation weights by term type and paragraph type.

TABLE 1

Overview of Weighting and Linking scheme

| | Paragraph Type with respect to Term | | | | |
|---|---|---|---|---|---|
| Term Type | "front" | "rear" | "during" | "no link" | Link Length |
| Proper NP | 10 | 8 | −3 | * | 8 |
| Common NP | 10 | 8 | −3 | * | 4 |

TABLE 1-continued

Overview of Weighting and Linking scheme

| | Paragraph Type with respect to Term | | | | |
|---|---|---|---|---|---|
| Term Type | "front" | "rear" | "during" | "no link" | Link Length |
| Pronouns & Possessives | 1 | 13 | −1 | * | 0 |

Figure 9:
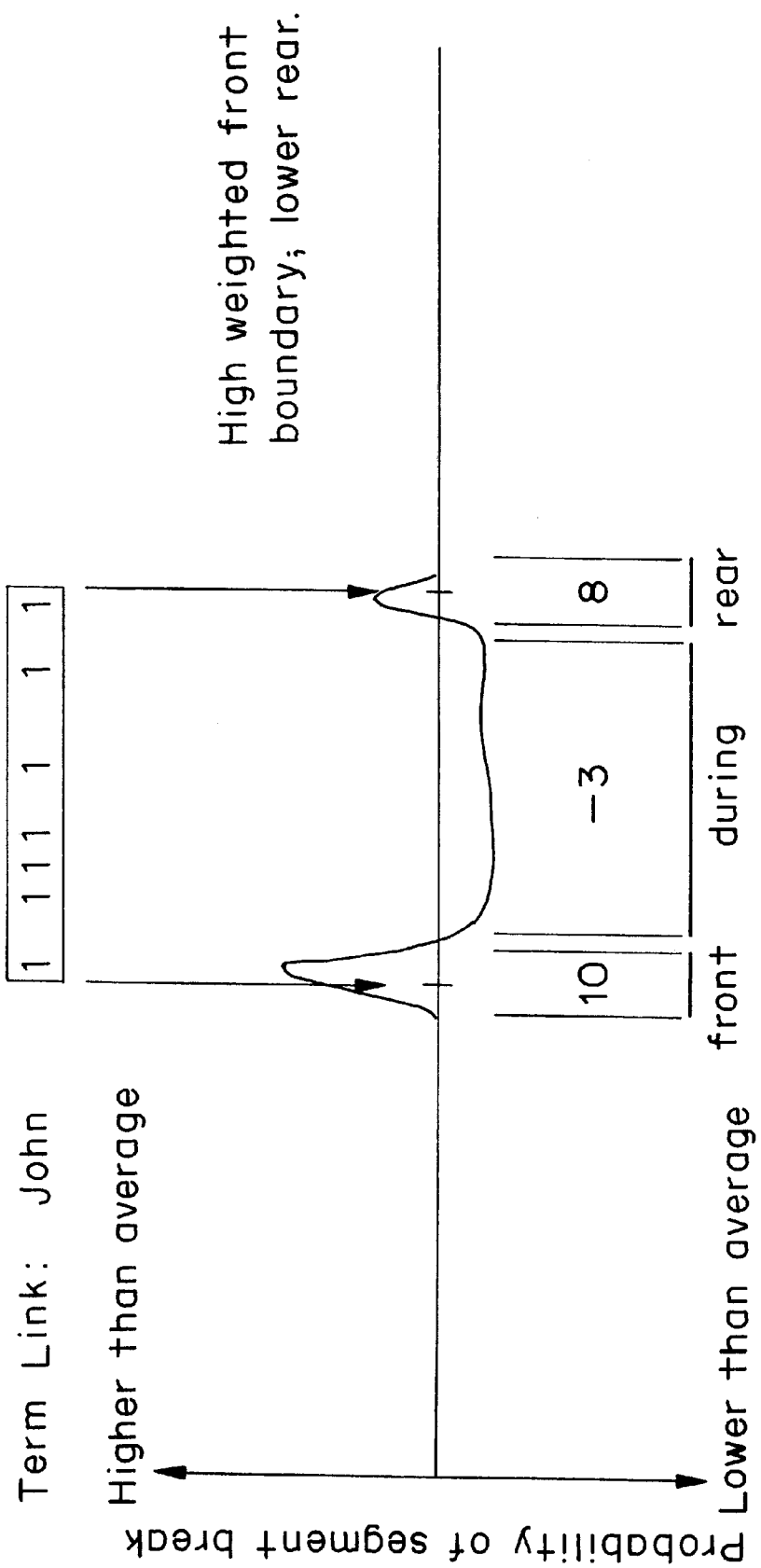
FIG. 9 shows an example of term weighting for proper and common nouns.
Figure 10:
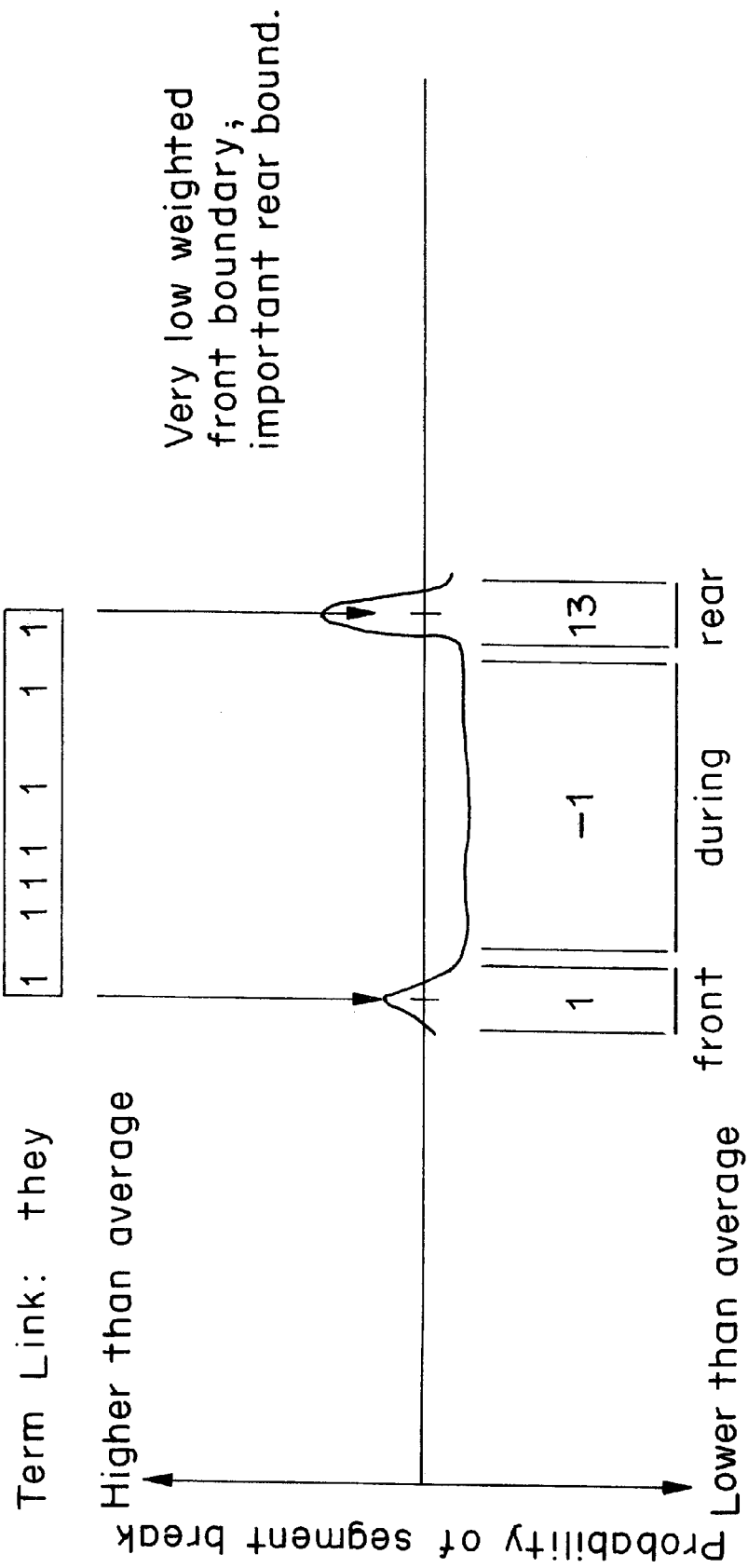
FIG. 10 shows an example of term weighting for pronominals.

FIG. 8 is similar tp FIG. 4, but in addition shows on the fifth line labeled "score" the weighted score for each of the paragraphs of the previously discussed "wine" example. FIGS. 9 and 10 show term weighting examples for proper and common nouns and pronominals.

For noun phrases, it is assumed that the introduction of the term is a point at which a new topic may be opened (vocabulary introduction). See C. G. Youmans, "A New Tool for Discourse Analysis: The Vocabulary-management Profile," *Language,* vol. 67 at pp. 763–789 (1991). Thus, a positive score is assigned to "front" paragraphs having proper and common noun phrases. Similarly, when a term is no longer being used, as in the "rear" paragraphs, the topic may be closed. However, since this observation may not be as direct as vocabulary introduction, and thus presumably not as strong a marker of topic change, a smaller positive score is assigned to "rear" paragraphs having proper and common noun phrases. Moreover, paragraphs in which the link persists throughout indicate that a topic continues; thus a negative score is assigned to "during" paragraphs.

When scoring paragraphs having pronoun terms, the same rationale applies with some modifications. Since the majority of pronoun referents occur before the pronoun, i.e., anaphoric as opposed to cataphoric, the front boundary is not heavily weighted as for proper and common noun phrases, but instead emphasis is placed on the rear boundary.

Thus, by assigning the appropriate weights to each of the paragraphs, a numerical score is provided that indicates which paragraphs are more likely to reflect topical boundary. The higher the numerical score, the higher the likelihood that the paragraph is a beginning of a new topical segment.

Once the weighting process is completed, zero-sum normalization is performed by module 216 to determine exactly where the topical segments are located. First, as shown on the sixth line of FIG. 8, a "sum to balance in zero-sum weighting" is computed for each of the extracted terms that equals the sum of all the individual paragraph scores corresponding to each term, e.g., the sum of all the "front," "rear" and "during" paragraph scores. The negative of the sum to balance is then evenly distributed to the remaining "no link" paragraphs to ensure that the net sum of the weight assigned by the weighting of each term sums to zero, and thus that the weighting of the entire article also sums to zero.

With respect to individual paragraphs, their summed score (sum of all terms) will result in a positive or negative total. A positive score indicates a boundary, a beginning of a new topical segment, whereas a negative score indicates a continuation of a segment. This use of zero-sum weighting solves the problem of finding a threshold, since the data is normalized around the value zero.

Examination of Segmenter output indicates that zero-sum weighting for long or medium length documents yields good results. For the documents examined, namely documents of short length (800–1500 words), it has been observed that clusters of multiple consecutive paragraphs, all with a positive summed score, actually only have a single, true boundary. In these cases, local maxima, i.e., the maximally valued paragraph, for each of these clusters is considered the only true segment boundary. Thus, for documents of short length (800–1500 words), wherein the distribution of words tends to smear the segmentation values across paragraphs, the sole topical segment boundary is chosen to correspond to the local maxima of the individual paragraph scores.

"Training" of the above-described segmentation algorithm was performed to derive the weights and link lengths n shown in Table 1. A total 225 settings were used to derive the optimal link lengths and weights for the three term types, i.e. common nouns, proper nouns and pronominal forms. Values for each of the types were optimized separately, meaning that optimal settings from the group of 225 settings were tried for each of the term types independently from the settings of the other term types; for each of the term types, 5 different settings were tried for the "front" weight, 5 different settings for the "rear" weight, 3 different settings for the "during" weight, and 3 different settings for the link length. By counting the number of correct segments, as judged by human subjects, the optimal values were determined for each weight and link length.

Referring again to FIGS. 2 and 3, the topical segments generated by segmentation module 210 is then subject to additional processing by segment significance module 222. The function of the segment significance module 222 is to measure the relevance of each segment as a function of a segment's importance and coverage as described below in detail. The segment significance module 222 uses a two-stage, sequential approach for determining segment importance and coverage.

First, the segment significance module 222 is used to compute the importance of one or more segments with respect to the content of the document input. "Segment importance" is defined as a measure of how related a given segment is to presenting key information about the article as a whole. The preferred metric, as included in the Segmenter code listing of Appendix A, is Term Frequency (TF) *Segment Frequency (SF). TF refers to the number of times the term appears in the document, whereas SF refers to the number of segments containing that term. As such, the present invention utilizes a variant of Salton's (1989) information retrieval metric, Term Frequency*Inverse Document Frequency (TF*IDF), to calculate the importance of a particular given segment. See G. Salton, *Automatic Text Processing: The Transformation, Analysis, and Retrieval of Information by Computer* (Addison-Wesley, Reading, Mass. 1989).

Intuitively, a segment containing noun phrases used in other segments of the document will be more central to the meaning of text than a segment that contains noun phrases used only within that one segment. Higher scores along the TF*SF metric indicate a more central segment, with which we equate with segment importance.

Thus, the segment significance module 222 first calculates the TF*SF score for each term using the term occurrence information and segment boundaries provided by the segmentation module 210. A raw segment importance score is then computed, which is the sum of the TF*SF scores of each of the terms in the segment. The raw segment importance score is then normalized by dividing the raw segment importance by the maximum of all raw segment importance scores for all segments. The normalized raw segment importance score is referred to as the "segment importance score." FIG. 12 shows pseudocode for computing the segment importance score.

However, in order to more accurately determine segment significance, the segment significance module 222 further computes a score that measures each segment's "coverage" within the document input. The notion of "coverage" is now illustrated with reference to the following example and FIG. 11.

With respect to hypothetical segments A-2 and B-2 in FIG. 11, if the term units/links x and y contained therein are equivalent, it can be said that segment B-2 has better "coverage" due to the fact that the noun phrases in B-2 appear within all three segments, whereas the noun phrases in segment A-2 appear only in two segments. Thus, to calculate segment coverage, the segment significance module 222 iterates over all the occurrences of all terms within a segment, and increments the coverage score by an appropriate amount. The amount depends on the number of terms previously seen that also fall in the same segment. Preferably, a harmonic series is used to determine the score: for the first occurrence of a term in some segment, the value "1" is added to the segment's coverage score; for a second occurrence of the same term in the same segment, the value "½" is added; for a third occurrence, the value "⅓", and so forth.

Therefore, in order to determine the segment coverage for a selected segment, segment coverage counters corresponding to each of the topical segments are initialized to zero. For each term occurring in the selected segment, the corresponding segment counter is incremented by an appropriate amount as determined by the number of linked occurrences (term units/links) within that selected segment. In addition, all of the other segment counters corresponding to the "non-selected" segments are incremented by an appropriate amount only if those "non-selected" segments contain the same term units/links found in selected segment. Reference is now made to FIG. 11 for an example showing the computation of segment coverage scores when using the above-mentioned harmonic series to increment the segment counters.

In the case of document A in FIG. 11, the x and y strings indicate linked occurrences or term units/links x andy. Each of the corresponding segment counters, i.e., segment counter A-1, segment counter A-2 and segment counter A-3, are initialized to zero prior to computation of the respective segment coverage scores. Thus, segment counter A-1=0, segment counter A-2=0, and segment counter A-3=0.

Next, consider the raw segment coverage score for A-1 (RSC A-1). In order to compute RSC A-1, segment counter A-1 is incremented by 1 to register a first occurrence of a term unit/link (term unit/link x) within the segment A-1. Next, segment counters corresponding to all other "non-selected" segments containing occurrences of term unit/link x are also incremented in accordance with the harmonic series. Thus, segment counter A-2 is incremented by 1. The value of the A-3 segment counter, however, remains unchanged due to the absence of term unit/link x from segment A-3. Thus, after considering term unit/link x, segment counter A-1=1, segment counter A-2=1, and segment counter A-3=0.

Next, the segment significance module 222 considers the occurrences of the term unit/link y since term unit/link y is also found in segment A-1. Since a term unit/link has already been detected in segments A-1 and A-2, both the A-1 and A-2 segment counters are incremented by a lesser amount, 0.5, to register a second occurrence of a term unit/link (term unit/link y) within the segments A-1 and A-2. Segment A-3, which has no occurrences of either term units/links x or y, remains unchanged at zero. Thus, after considering term unit/link y, segment counter A-1=1.5(1+0.5), segment counter A-2=1 (1+1.5), and segment counter A-3=0 (0+0). The raw segment coverage score for segment A-1 is then given by the sum of the segment counters for segments A-1, A-2 and A-3, i.e., RSC A-1=1.5(A-1)+1.5(A-2)+0(A-3)=3.

All the segment counter values are then re-initialized to zero in order to determine the raw segment coverage scores for the next selected segment. Thus, is accordance with this method, the raw segment coverage (RSC) scores for segment A-2 is as follows: RSC (A-2)=1.5 (A-1)+1.5 (A-2)+0=3. Since no term unit/links were identified in segment A-3, RSC (A-3)=0.

In the case of document B, segment counter B-1, segment counter B-2 and segment counter B-3 are all initialized to zero: segment counter A-1=0, segment counter A-2=0, and segment counter A-3=0. For computing RSC B-1, segment counter B-1 and segment counter B-2 are incremented by 1 to register the occurrences of term unit/link x within the corresponding segments. Segment counter B-3 however remains at zero since there are no occurrences of term unit/link x. After considering term unit/link y, segment counter B-1=1(1+0), segment counter B-2=1.5(1+0.5) and segment counter B-3=1(+1). Thus, the RSC score for segment B-1 is as follows: 1(B-1)+1 (B-2)+0(B-3)=2. Similarly, RSC (B-2)=1(B-1)+1.5(B-2)+1 (B-3)=3.5; and RSC (B-3)= 0(B-1)+1(B-2)+1(B-3)=2.

The raw segment coverage scores, as shown in FIG. 12, are then normalized according to the following formula to yield the segment coverage score: segment coverage score= raw segment coverage/maximum of all raw segment coverage scores for all segments.

As further shown in FIG. 12, the segment significance scores for each of the topical segments are computed by adding the corresponding segment importance and segment coverage scores. Nominally, segment significance scores range from 0.0 (not important) to 2.0 (maximally important).

In contrast to segment importance, which examines the prominence of a segment versus every other segment, the segment function module 224 of FIG. 2 considers the role of each segment in the discourse structure of the document input. The segment function module 224 thus is aimed at measuring or characterizing the particular purpose or function of each segment with respect to the article as a whole. Each segment is thus classified into one of three different types of segments: a summary segment, an anecdotal segment, or a support segment.

"Summary" segments are those segments of a document input that summarize the content of the document input. Such a segment is assumed to function as an overview, the summary occurring towards the beginning of the document input, or as a conclusion, i.e., near the end of the document input. Therefore, the position of the segment within the document is a critical factor. It has been found that summary segments are usually those segments having the highest segment importance from those segments that occur within the first and last 20% of a document input. In addition, the corresponding segment importance rating is usually within the top 10% of all segment importance ratings. Accordingly, a summary segment for a given document input is defined as that segment having the highest segment importance out of all segments occurring within the first and last 20% of the document input, wherein the segment importance rating of that segment is within the top 10% of all segment importance ratings. Preferably, the segment function module 224 of the present invention is designed to recognize only one summary segment per document.

"Anecdotal" segments or "leads" are opening remarks that catch the reader's attention and thus draw the reader into the main body of the article itself. Similarly, closing remarks are often clever comments for effect, but do not convey as much content as opening remarks. Ancedotal segments are thus limited to the first and last segments of the document input of an input document.

Empirical evidence suggests that in the domain of journalistic text, for example, at least a single person is introduced during an anecdotal segment to relate the interesting fact or narrative. This person is often not mentioned outside the segment; since the purpose of relating anecdotal information is limited in scope to the anecdotal segment itself. Accordingly, the segment function module 224 of FIG. 2 looks for a proper noun phrase that occurs only within the candidate segment, and not in other segments. This first or last segment is then labeled as anecdotal, if it has not been already selected as the summary segment.

"Support" segments are the default segment type. If a segment is not categorized as a summary or anecdotal segment, then it is categorized as a support segment.

Thus, in addition to topical segmentation, the method and system of the present invention also prioritizes the identified discourse segments as to their relevance towards the whole document input: topical segments are identified that contribute some detail towards the main topic of the document input and that summarize the key points. As discussed below in detail, the method for determining segment significance of the present invention has been evaluated as part of the Segmenter program that utilizes highly pertinent segments to extract key sentences.

The applicability of the Segmenter program was tested using general domain news articles. Generally, it was found that longer articles, usually those more than three pages in length, tended to have their own headers or bullets, and were excluded because of these prior segmentation markings. Thus, tests using Segmenter primarily focused on segmenting shorter articles, each roughly 800–1500 words in length: 15 from the Wall Street Journal in the Linguistic Data Consortium's 1988 collection, and 5 from the on-line The Economist from 1997.

For the segmentation algorithm of FIG. 3, a segmentation evaluation facility developed was used to gather segmentation judgments. Each of the 20 articles in the corpus was segmented by at least four human judges, and the majority opinion of segment boundaries was computed as the evaluation standard.

Table 2 below shows precision and recall results for the Segmenter computer program of FIG. 3 as compared to conventional topical segmentation techniques. "Precision" is defined as the ratio of the number of correct segmentations made over the total number of segmentations made, and "recall" is defined as the ratio of the number of correct segmentations made over the total number of correct segmentations possible. As shown in Table 2 below, human judges achieved on average only 62.4% agreement with the majority opinion, i.e., the "correct" segmentation. Passonneau and Litman (1993) show that this surprisingly low agreement is often the result of evaluators being divided between those who regard segments as more localized and those who prefer to split only on large boundaries. See R. J. Passonneau and D. J. Litman, "Intention-based Segmentation: Human Reliability and Correlation with Linguistic Cues," *Proceeding of the 31 st Annual Meeting of the Association of Computation Linguistics,* pp. 148–155 (1993).

Next, we verified that the task was well defined by testing for a strong correlation between the markings of the human judges. We tested for inter-judge reliability using Cochran's (1950) Q-test, also discussed in Passonneau and Litman (1993). A very high correlation was found between judges that showed that the task was indeed feasible to model; the results showed that there was less than a 0.15% chance on the average that the judges' segment marks agreed by chance.

TABLE 2

Evaluation Results on Precision and Recall Scales

|  | WSJ | | | | Econ. | | | | Total | | | |
| --- | --- | --- | --- | --- | --- | --- | --- | --- | --- | --- | --- | --- |
|  | Precision | | Recall | | Precision | | Recall | | Precision | | Recall | |
|  | Avg | S.D. | Avg | S.D. | Avg | S.D. | Avg. | S.D. | Avg. | S.D. | Avg. | S.D. |
| Monte Carlo 33% | 29.0% | 9.2 | 33.3% | .02 | 32.8% | 12.6 | 33.3% | .02 | 29.8% | 9.9 | 33.3% | .02 |
| Hypergeometric | 30.6% | N/A | 30.6% | N/A | 32.9% | N/A | 32.9% | N/A | 30.0% | N/A | 32.0% | N/A |
| TextTiling | 28.2% | 18.1 | 33.4% | 25.9 | 18.3% | 20.7 | 18.7% | 18.5 | 25.8% | 18.7 | 29.8% | 27.8 |
| Segmenter | 47.0 | 21.4 | 45.1% | 24.4 | 28.6% | 26.2 | 22.67% | 25.2 | 42.6% | 23.5 | 39.6% | 25.9 |
| Human Judges | 67.0% | 11.4 | 80.4% | 8.9 | 55.8% | 17.2 | 71.9% | 4.6 | 62.4% | 13.5 | 78.2% | 87.6 |

As shown by Table 2, segmentation results attained with Segmenter show a significant improvement over the TextTiling of Hearst, both in precision and recall. As a basis for these results, Table 2 shows two different baselines from which the Segmenter results are compared: the first being a Monte Carlo simulation that segments at paragraph breaks with a 33% probability. We executed this baseline 10,000 times on each article and averaged the scores. A second baseline was produced by applying a hypergeometric distribution, which calculates the probability of some number of successes by sampling without replacement. The hypergeometric distribution models the selection of N "segment breaks" randomly in a document with R possible segment breaks (for us, paragraphs breaks). Therefore, it is equivalent to a technique of randomly choosing places to segment if you knew ahead of time how many segments there were. However, as suggested by the results in Table 2, it can be shown that the correct number of segments, R, is difficult to determine. TextTiling's performance meanwhile falls below the hypergeomtric baseline; but on the average Segmenter outperforms it.

In summary, we have presented a novel new method for representing the discourse structure of a document input while categorizing segment function is heretofore described. The foregoing demonstrate how retrieval of noun phrases and pronominal forms, along with a zero-sum weighting scheme, can be used for determining topical segments that accurately represent the content of the document input. Furthermore, term distribution is used to aid in identifying the role that the segment performs in the document. Evaluation results in terms of precision and recall indicate that the performance of the linear topical segmentation method of the present invention surpasses that of conventional segmentation schemes known in the art.

Although the present invention has been described in connection with particular embodiments thereof, it is to be understood that various modifications, alterations and adaptions may be made by those skilled in the art without departing from the spirit and scope of the invention. It is intended that the invention be limited only by the appended claims.

What is claimed is:

1. A computer-based method for identifying topical segments of a document input, comprising:
   extracting one or more selected terms from a document;
   linking occurrences of said extracted terms based upon the proximity of similar terms;
   assigning weighted scores to paragraphs of said document input corresponding to said linked occurrences, wherein said scores depend upon the type of said selected terms and the position of said linked occurrences with respect to said paragraphs, and wherein said scores define boundaries of said topical segments; and
   zero-sum normalizing said assigned weighted scores to determine said topical boundaries.

2. The method according to claim 1, wherein said selected terms are noun phrases.

3. The method according to claim 2, wherein said noun phrases are proper, common and pronominal noun phrases.

4. The method according to claim 1, wherein said extracting step comprises identifying one or more noun phrases each having a noun preceded by an adjective or noun, if any.

5. The method according to claim 1, wherein said extracting step comprises the step of post-processing said extracted terms to merge occurrences of related terms in accordance with one or more language rules.

6. The method according to claim 5, wherein said post-processing step comprises merging occurrences of possessive pronouns with a corresponding personal pronoun.

7. The method according to claim 5, wherein said post-processing step comprises reducing a noun phrase in accordance with a corresponding head.

8. The method according to claim 1, wherein said extracting step comprises thresholding said extracted terms to filter out irrelevant terms.

9. The method according to claim 1, wherein said linking step comprises linking occurrences of said extracted terms in accordance with one or more predefined linking distances.

10. The method according to claim 1, further comprising the step of determining a segment significance for each of said topical segments to indicate the relevance of said topical segments.

11. The method according to claim 10, wherein determining said segment significance comprises:
    determining a segment importance; and
    determining a segment coverage.

12. The method according to claim 10, wherein determining said segment significance comprises:
    computing a segment importance score;
    computing a segment coverage score; and
    summing said segment importance score and segment coverage score.

13. The method according to claim 12, wherein said step of computing said segment importance score for a selected one of said topical segments comprises:
    computing TF*SF values corresponding to each of said terms within said selected topical segment, wherein TF is defined as a term frequency and SF is defined as a segment frequency; and
    summing said TF*SF values to obtain a TF*SF sum, wherein said sum represents said segment importance score.

14. The method according to claim 10, wherein said segment coverage is defined at least in part on the number of said linked occurrences within the same topical segment.

15. The method according to claim 10, wherein said step of computing said segment coverage score for a selected one of said topical segments comprises:
    initializing segment counters to zero for each of the topical segments;
    incrementing, for linked occurrences contained within said selected segment, a corresponding one of said segment counters by a predetermined amount;
    incrementing one or more segment counters corresponding to non-selected segments by a predetermined amount only if said non-selected segments contain one or more of said linked occurrences contained within said selected segment;
    summing all of said segment counters to obtain a segment counter sum, wherein said sum represents said segment coverage score.

16. The method according to claim 1, further comprising the step of determining a segment function to measure the relevance of said topical segments with respect said document input as a whole.

17. The method according to claim 16, wherein said step of determining a segment function comprises identifying one or more summary segments.

18. The method according to claim 16, wherein said step of determining a segment function comprises identifying one or more anecdotal segments.

19. The method according to claim 16, wherein said step of determining a segment function comprises identifying one or more support segments.

20. The method according to claim 1, wherein the linking step includes using at least a first linking distance for a first term type and a second linking distance for a second term type.

21. The method according to claim 3, wherein the linking step includes using a first linking distance for said proper noun phrases, a second linking distance for common noun phrases and a third linking distance for pronominal noun phrases.

22. A computer based method for automatically extracting significant topical information from a document, comprising:
    extracting topical information from a document in accordance with specified categories of information;
    linking occurrences of said extracted topical information based on the proximity of similar topical information;
    assigning weighted scores to paragraphs of said document input corresponding to said linked occurrences, wherein said scores depend upon the type of said selected terms and the position of said linked occurrences with respect to said paragraphs, and wherein said scores represent boundaries of said topical segments;

zero-sum normalizing said assigned weighted scores to determine said topical boundaries;

determining topical segments within said document corresponding to said linked occurrences of said topical information; and determining the significance of said topical segments.

23. The method according to claim 22, wherein said extracting step comprises extracting selected types of noun phrases from said document.

24. The method according to claim 22, wherein said step of determining topical segments comprises linking occurrences of said extracted noun phrases based upon the proximity of similar noun phrases.

25. The method according to claim 22, wherein said step of determining the significance of said topical segments comprises:

determining a segment importance; and determining a segment coverage.

26. The method according to claim 22, wherein said step of determining said segment significance comprises:

computing a segment importance score;

computing a segment coverage score; and summing said segment importance score and segment coverage score.

27. The method according to claim 26, wherein said step of computing said segment importance score for a selected one of said topical segments comprises:

computing TF*SF values corresponding for each of said terms within said selected topical segment, wherein TF is defined as a term frequency and SF is defined as a segment frequency; and summing said TF*SF values to obtain a TF*SF sum, wherein said sum represents said segment importance score.

28. The method according to claim 26, wherein said segment coverage is defined at least in part on the number of said linked occurrences within the same topical segment.

29. The method according to claim 26, wherein said step of computing said segment coverage score for a selected one of said topical segments comprises:

initializing segment counters to zero for each of the topical segments;

incrementing, for linked occurrences within said selected segment, a corresponding one of said segment counters by a predetermined amount;

incrementing one or more segment counters corresponding to non-selected segments by a predetermined amount only if said non-selected segments contain one or more of said linked occurrences contained within said selected segment;

summing all of said segment counters to obtain a segment counter sum, wherein said sum represents said segment coverage score.

30. The method according to claim 22, further comprising the step of determining a segment function to measure the relevance of said topical segments with respect said document input as a whole.

31. The method according to claim 30, wherein said step of determining a segment function comprises identifying one or more summary segments.

32. The method according to claim 30, wherein said step of determining a segment function comprises identifying one or more anecdotal segments.

33. The method according to claim 30, wherein said step of determining a segment function comprises identifying one or more support segments.

34. A computer program for identifying topical segments of a document input, comprising:

means for extracting selected terms from a document;

means for linking occurrences of said extracted terms based upon the proximity of similar terms;

means for assigning weighted scores to paragraphs of said document input corresponding to said linked occurrences, wherein said scores depend upon the type of said selected terms and the position of said linked occurrences with respect to said paragraphs, and wherein said scores represent boundaries for said topical segments; and means for zero sum normalizing said assigned weighted scores to determine said topical boundaries.

35. A computer program for automatically extracting significant topical information from a document, comprising:

means for extracting topical information from a document in accordance with specified categories of information;

means for linking occurrences of said extracted topical information based on the proximity of similar topical information;

means for assigning weighted scores to paragraphs of said document input corresponding to said linked occurrences, wherein said scores depend upon the type of said selected terms and the position of said linked occurrences with respect to said paragraphs, and wherein said scores represent boundaries of said topical segments;

means for determining topical segments within said document corresponding to said linked occurrences of said topical information; and means for determining the significance of said topical segments including determining a segment importance and determining a segment coverage.

* * * * *

UNITED STATES PATENT AND TRADEMARK OFFICE
CERTIFICATE OF CORRECTION

PATENT NO.      : 6,473,730 B1
DATED           : October 29, 2002
INVENTOR(S)     : McKeown et al.

It is certified that error appears in the above-identified patent and that said Letters Patent is hereby corrected as shown below:

Column 5,
Line 3, "recalL" should read -- recall. --

Column 7,
Line 11, "tp" should read -- to --

Column 9,
Line 40, "x andy." should read -- x and y. --

Column 11,
Line 5, "Ancedotal" should read -- Anecdotal --

Column 12,
Line 15, "31 st" should read -- 31st --
Line 64, hypergeomtric" should read -- hypergeometric --

Column 13,
Line 1, "is" should read -- as --
Lines 14-15, "adaptions" should read -- adaptations --

Column 15,
Line 56, "segment;" should read -- segment; and --

Signed and Sealed this

Ninth Day of March, 2004

JON W. DUDAS
*Acting Director of the United States Patent and Trademark Office*